United States Patent [19]
Alvarez

[11] 3,890,362
[45] June 17, 1975

[54] PREPARATION OF THIOHYDROXIMATE CARBAMATES

[75] Inventor: Jose R. Alvarez, Wilmington, Del.

[73] Assignee: E. I. du Pont de Nemours & Company, Wilmington, Del.

[22] Filed: June 19, 1972

[21] Appl. No.: 263,760

[52] U.S. Cl. ............................................. 260/453 R
[51] Int. Cl.² ......................................... C07C 119/18
[58] Field of Search .......... 260/453 R, 566 AC, 691

[56] References Cited
UNITED STATES PATENTS

| | | | |
|---|---|---|---|
| 2,912,428 | 11/1959 | Gaertner | 260/152 |
| 3,223,733 | 12/1965 | Heiss et al. | 260/566 AC |
| 3,328,457 | 6/1967 | Payne, Jr. | 260/566 AC |
| 3,497,315 | 2/1970 | Pratt | 23/75 |
| 3,560,555 | 2/1971 | Fuchs | 260/453 R |
| 3,576,834 | 4/1971 | Buchanan | 260/453 R |

OTHER PUBLICATIONS

Henry et al., "Aromatic Isocyanates as Reagents etc.," (1949) J.A.C.S. 74 pp. 2297–2300 (1949).
Riegel, "Chem. Process Machinery" (1953) Reinhold (1953) pp. 286–307 TP57 R53.
Chem. Eng. Catalog 52nd ed., (1968) (CEC) I Reinhold N.Y. section N–30 pp. 1–16 (1968) TP157.04.
Chem. Eng. Catalog 51st ed. (1967) (CEC) II Reinhold N.Y. section N–30 App. (1966) TP157.04.

*Primary Examiner*—Glennon H. Hollrah

[57] ABSTRACT

S-alkyl N-[(methylcarbamoyl)oxy]thioimidates, sometimes referred to herein as S-alkyl thiohydroximate carbamates, are made in high yield by reacting solid, particulate S-alkyl thiohydroximates with liquid or gaseous methyl isocyanate in the absence of a continuous liquid phase.

8 Claims, No Drawings

PREPARATION OF THIOHYDROXIMATE CARBAMATES

BACKGROUND OF THE INVENTION

Organic chemical reactions at temperatures below the melting point of at least one of the reactants usually must be carried out in liquid solvent systems, in order to obtain reasonably fast, complete reaction with a minimum of by-products. The solvent system provides a molecular or near-molecular dispersion of the solid reactant(s) and also provides mobility for the molecules. Thus, each molecule is accessible and free to travel, and can meet and react quickly with molecules of the other reactant(s).

In contrast, when a solid-state reaction system is used, only the surface molecules of the solid reactant(s) are accessible for reaction, unless one reactant is capable of diffusing into the particles of the other reactant. Even in the latter case, solid state systems are generally unsatisfactory for conducting reactions on a commercial scale because reaction reates are diffusion-controlled and slow compared to solvent system reactions, and because the reaction product may block the internal and external surfaces on which it is formed, thereby preventing access to molecules of the solid reactant, and causing the reaction to slow down or stop. Also, high local concentrations of reactants occur, resulting in the formation of unwanted by-products.

Some of these problems of a solid-state reaction system are illustrated by the work of Pinero et al. reported in *Ind. Eng. Chemistry Process Des. Develop.*, Vol. 10, No. 4, pp. 476–482, Oct., 1971. The article describes experimental work on the kinetics of a solid-state reaction between sulfathiazole and succinic anhydride. In this work compression at 1,000 Kg./cm.$^2$ was used to get good contact of reactants. Nevertheless, stoppage of the reaction before completion because of pluggage of acess to reactive surfaces was reported, and the highest conversions shown were only 80%.

Reaction between solid S-alkyl thiohydroximates and methyl isocyanate to produce S-alkyl thiohydroximate carbamates has heretofore been carried out only in liquid solvent systems. U.S. Patent 3,506,698 teaches reacting an aqueous solution of S-methyl thioacetohydroximate with methyl isocyanate to produce S-methyl N-[(methylcarbamoyl)oxy]-thioacetimidate; U.S. Pat. No. 3,576,834 teaches the same reaction in methylene chloride solution, U.S. Pat. No. 3,560,555 and U.S. Pat. No. 3,530,222 teach the reaction of S-methyl 1-(dimethylcarbamoyl)-thioformhydroximate with methyl isocyanate to produce S-methyl 1-(dimethylcarbamoyl)-N-[(methylcarbamoyl)oxy]-thioformimidate in acetone solution.

It has now been found that fast reaction, high quality, and excellent yields can be achieved in these reactions in the absence of a continuous liquid phase by addition of the methyl isocyanate to an agitated bed of solid particles of the S-alkyl thiohydroximate. This was surprising because of the difficulties normally encountered with solid-state reaction systems, which lead to slow reaction, low yield and the formation of undesired by-products. The only known instance in which a solid-state reaction system has been successfully used to produce a carbamate is that disclosed in pending U.S. Pat. Application Ser. No. 733,756 filed 6/3/68, now abandoned. The process of that application, however, involves the reaction between the alkyl isocyanate and an alkyl 2-benzimidazolecarbamate, not an S-alkyl thiohydroximate. Furthermore, that process requires the use of a catalytic amount of an inert organic solvent, which can be used but is not required in the process of this invention.

There is considerable manufacturing advantage in reaction without the use of a solvent. When a solvent is used, it must be removed by expensive processing steps in order to prepare a solid product; for example, the organic solvent can be displaced by evaporation while adding water. The product can be crystallized from water by evaporative crystallization, separated by centrifugation, and dried in conventional dryers. This multi-step process requires large investment and operating expense. The reaction without a solvent permits elimination of the distillation, crystallization, and drying steps and, therefore, is a less expensive process.

SUMMARY OF THE INVENTION

This invention is an improvement in the process of making S-alkyl thiohydroximate carbamates of the formula:

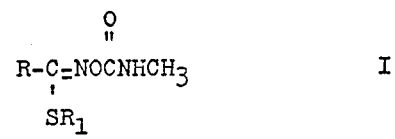

wherein
R is methyl, ethyl, or

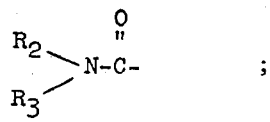

$R_1$ is methyl, ethyl, n-propyl, or isopropyl;
$R_2$ is hydrogen, methyl, ethyl, n-propyl, or isopropyl; and
$R_3$ is hydrogen or methyl, provided that when $R_2$ is ethyl, n-propyl or isopropyl, $R_3$ is hydrogen;
by reacting methyl isocyanate with an S-alkyl thiohydroximate of the formula:

wherein R and $R_1$ are as defined above.

The improvement comprises carrying out the reaction by adding the methyl isocyanate in gaseous or liquid form to an agitated bed of solid particles of the S-alkyl thiohydroximate in the absence of a continuous liquid phase, while removing the heat of reaction. The rates of isocyanate addition and heat removal are balanced so as to maintain the temperature of the reaction mass at or above 0°C but below the melting points of the starting thiohydroximate, and the thiohydroximate carbamate finished product. The preferred temperature is between about 25°C and the temperature at which the reaction mass becomes tacky.

This improved process provides the products of formula I in high yield and quality in acceptable reaction times, without the investment required to conduct solvent reactions.

DETAILS OF THE INVENTION

Melting points for several of the thiohydroximate carbamates of formula I are listed in the following tables:

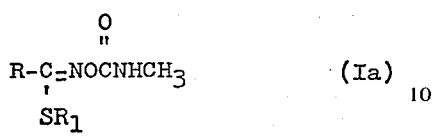
$$R-C=NOCNHCH_3 \quad \text{(Ia)}$$
$$\underset{SR_1}{|}$$

| R | $R_1$ | m.p.°C |
|---|---|---|
| $CH_3$ | $CH_3$ | 79–80 |
| $CH_3$ | $C_2H_5$ | 61–62 |
| $CH_3$ | iso—$C_3H_7$ | 60.5–61.5 |
| $C_2H_5$ | $CH_3$ | 44 |
| $C_2H_5$ | $C_2H_5$ | 56.5–57.5 |

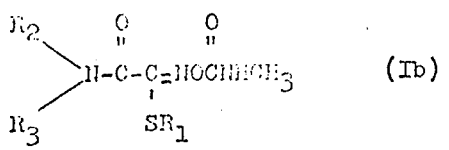

| $R_1$ | $R_2$ | $R_3$ | m.p.°C |
|---|---|---|---|
| $CH_3$ | H | H | 176–177 |
| $CH_3$ | $CH_3$ | H | 112–113 |
| $CH_3$ | $C_2H_5$ | H | 125–127 |
| $CH_3$ | n—$C_3H_7$ | H | 87–88 |
| $CH_3$ | i—$C_3H_7$ | H | 140–142 |
| $CH_3$ | $CH_3$ | $CH_3$ | 101–102 |
| $C_2H_5$ | H | H | 156–157 |
| $C_2H_5$ | $CH_3$ | $CH_3$ | 61–63 |

All of the precursor thiohydroximates for the above compounds are solids at 25°C.

The improved process of this invention can be carried out either batchwise or continuously while maintaining the reaction mass at or above 0°C but below the melting points of the thiohydroximate precursor (compound of formula II) and the thiolhydroximate carbamate end product (compound of formula I). It is preferred to operate at or above 25°C but below the temperature at which the reaction mass becomes tacky.

The process can be carried out at reduced or elevated pressures, but atmospheric pressure is preferred for economic reasons.

The preferred molar ratio of methylisocyanate to the hydroximate is 0.95 to 1.05 although 0.98 to 1.02 is the most preferred ratio. More than the stoichiometric amount of isocyanate can be used, but this results in increased impurities and a waste of the isocyanate.

The methylisocyanate can be added to the reaction mass over a period of time from 1 to 12 hours. The time will depend mainly on rate of removal of heat of reaction and rate of diffusion of methylisocyanate into the hydroximate particles. The preferred isocyanate addition time ranges from 1 to 5 hours followed by a 1 to 2 hour hold period which allows any residual, unreacted isocyanate to react.

The rates of heat removal and isocyanate addition are balanced so as to maintain the reaction mass at the desired temperature and degree of "dampness". It is most preferred to balance these rates so that the reaction mass resembles a damp powder throughout the isocyanate addition.

Use of a catalyst is optional in some cases. For example, a catalyst is necessary for producing the compound where R is

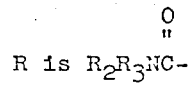
$$R \text{ is } R_2R_3NC-$$

and $R_1$, $R_2$ and $R_3$ are methyl, but is not required where R and $R_1$ are both methyl. However, use of a catalyst is preferred in all cases. Suitable catalysts include triethylamine, triethylenediamine, other such tertiary amines and alkali metal hydroxides such as sodium and potassium hydroxide. The preferred amount of catalyst is 0.001 to 0.01 moles of catalyst per mole of hydroximate.

If desired, a heel of finished hydroximate carbamate from previous production and/or solid, inert, particulate diluents can be mixed with the hydroximate particles to reduce the tackiness of the reaction mass. Any amount of heel can be used, but as a practical matter it will not exceed about 95% by weight of the reaction mass at the start of isocyanate addition. The amount of inert diluent likewise will ordinarily not exceed 95% by weight of the reaction mass. Where both a heel and an inert diluent are used, the hydroximate reactant ordinarily should comprise at least 5% by weight of the reaction mass at the start of the isocyanate addition, merely to avoid undue dilution of the reactant.

Inert diluents which can be used are those which are ordinarily used in solid, particulate agricultural formulations so that the product can be used in agriculture without further substantial processing. Examples of inerts which can be used are ammonium sulfate, sodium sulfate, urea, potassium chloride, diatomaceous earths, and clays such as those listed in Weidhaus and Brann, *Handbook of Insecticide Dust Diluents and Carriers*, Dorland Books (1955). Some of these have a plant physiological effect, but they are considered inert for purpose of this invention in that they do not enter into the reaction. The concentration of inert diluent in the reaction mass should not exceed the concentration desired in the final product. If desired, inerts can be added after the reaction is complete. Dispersants and anti-caking agents can also be included in the reaction mass. Suitable dispersants are listed in McCutcheon, *Detergents and Emulsifiers Annual*, 1970. Colloidal silica is a particularly suitable anti-caking agent.

The reaction vessel should be a mixing machine capable of producing a homogeneous reaction mass. Illustrative of such mixers that may be used are - "Change-Can" mixer, "Horseshoe" mixer with contrarotating paddles, "Kneader" mixer or "Sigmablade" mixer, mix-muller, pug mill, ribbon blender, ball mill, "V" blender, and double-cone blender. The mixer that is preferred is the mix-muller. In the mix-muller, heavy, solid metal wheels roll around the bottom periphery of a circular pan. Plows continually move the solid particles into the path of the heavy wheels. Particle size reduction takes place during mixing due to the action of the wheels of particles between the wheels and bottom and sides of the vessel. Some of the other types of mixers mentioned above also produce particle size reduction during mixing.

Particle size of the thiohydroximate reactant is not critical, but for best results the bulk of the particles should be below about 5 mesh before or during the reaction. Larger particles can be used with reaction vessels which produce particle size reduction during mixing. It is preferred that the bulk of the starting material be in the form of particles which will pass a 20 mesh sieve.

As indicated above, the rates of isocyanate addition and heat removal must be balanced so as to avoid formation of a continuous liquid phase and preferably so as to maintain the reaction mass in the form of a damp powder. In order to permit an acceptable rate of isocyanate addition, the reaction vessel should be fitted with a water cooled jacket, or other means should be used to accelerate heat removal.

EXAMPLE 1

Five hundred grams (4.68 g.-moles) of technical S-methyl thioacetohydroximate, containing 1.6% potassium chloride, were charged to a 12 inch diameter mix-muller fitted with a reflux condenser. The agitator was started and 3.4 mls (2.48 grams) (0.024 g.-moles) of triethylamine were added; this was followed by the uniform addition of 276.6 grams (4.85 g.-moles) of technical methylisocyanate over 2 hrs during which period the temperature of the solids was kept below 40°C by external cooling with water. During the addition of the isocyanate the reactor contents had the appearance of damp particulate solids. Agitation of the solids was maintained for two more hours while the temperature decreased to 31°C. There were recovered 768 grams (4.55 g.— moles) of granular technical S-methyl N-[(methylcarbamoyl)oxy]-thioacetimidate. A liquid chromatography assay of the product indicated it was 96.2% pure.

EXAMPLE 2

Five hundred and three grams (3.10 g.-moles) of technical S-methyl 1-(dimethylcarbamoyl)thioformhydroximate were charged to a 12 inch diameter mix-muller fitted with a reflux condenser. The agitator was started and 2.2 ml (1.6 grams) (0.0158 g.-moles) of triethylamine were charged. This was followed by the uniform addition of 184.6 grams (3.24 g.-moles) of methylisocyanate over a 2 hr period during which the temperature of the solids was kept between 26°C and 38°C by external cooling with water. Agitation of the solids was maintained for an additional 2 hr period. There were recovered 680 grams (2.97 g.-moles) of technical S-methyl 1-(dimethylcarbamoyl)-N-[(methylcarbamoyl)oxy]thioformimidate, 95.8% pure by liquid chromatography assay.

EXAMPLE 3

Grind one hundred and five pounds (454 g.-moles) of technical S-methyl thioacetohydroximate in a MikroPulverizer so that it all passes through a 150 U.S. Mesh screen. Charge the finely divided material to a five cubic feet stainless steel double ribbon blender fitted with water cooled jacket, a water cooled reflux condenser, and a solids temperature indicator. Start the agitator and charge two hundred and thirty-six grams (2.33 g.-moles) of triethylamine to the agitated solids over 15 minutes. Add fifty-eight and a half pounds (466 g.-moles) of technical methyl isocyanate uniformly over three hours while maintaining the temperature of the agitated solids below 40°C by adjusting the flow and temperature of the water circulated through the jacket of the blender. The isocyanate charge is introduced into the blender through four equally spaced nozzles installed under the blender lid along the central axial position and aimed at the bed of agitated solids. Maintain agitation of the solids for two hours after the isocyanate charge is finished. During this period decrease the temperature of the solids to 28°C. Recover one hundred and sixty-one pounds (451 g.-moles) of high quality technical S-methyl N-[(methylcarbamoyl)oxy]-thioacetimidate.

EXAMPLE 4

Grind forty-two pounds (181 g.-moles) of technical S-methyl thioacetohydroximate in a MikroPulverizer so that it all passes through a 150 U.S. Mesh screen. Charge the finely divided material to a tightly sealed two cubic feed nominal capacity stainless steel double ribbon vacuum drier fitted with a vacuum take-off, a jacket for cooling or heating and a solids temperature indicator. Start the agitator and reduce the internal vessel pressure to 25 mm Hg abs. Admit triethylamine (approximately 0.28 g.-moles) into the vessel until the pressure increases to 100 mm Hg abs. Admit twenty-three and two-tenths pounds (185 g.-moles) of methyl isocyanate into the vessel at such a rate that the solids temperature does not exceed 50°C and the vessel internal pressure does not exceed 600 mm Hg abs. After all the methyl isocyanate is charged, agitate the resulting solids for 2 more hours in the tightly sealed vessel, then admit air into the vessel until the pressure is equal to atmospheric. Discharge high quality technical S-methyl N-[methylcarbamoyl)oxy]thioacetimidate from the vessel.

EXAMPLE 5

Charge four hundred grams (2.47 g.-moles) of technical S-methyl N-[(methylcarbamoyl)oxy]thioacetimidate produced as per Example 1 to a 12-inch diameter mix-muller. fitted with a reflux condenser along with five hundred grams (4.68 g.-moles) of technical S-methyl thioacetohydroximate containing 1.6% potassium chloride. Add triethylamine catalyst and methylisocyanate in the amount and manner prescribed by Example 1. (Maintain agitation of the solids for two more hours after completion of the isocyanate addition). Recover 1165 grams (7.19 g.-moles) of granular technical S-methyl N-[(methylcarbamoyl)oxy]thioacetimidate of high purity.

I claim:

1. In the method of making S-alkyl thiohydroximate carbamates of the formula;

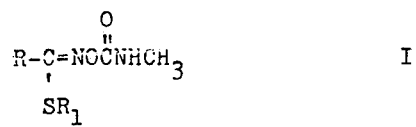

wherein
R is methyl, ethyl, or

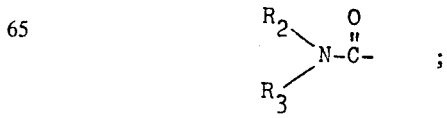

$R_1$ is methyl, ethyl, n-propyl, or isopropyl;

$R_2$ is hydrogen, methyl, ethyl, n-propyl, or isopropyl; and $R_3$ is hydrogen or methyl, provided that when $R_2$ is ethyl, n-propyl or isopropyl, $R_3$ is hydrogen;

by reacting methyl isocyanate with an S-alkyl thiohydroximate of the formula:

     II wherein R and $R_1$ are as defined above, the improvement which comprises carrying out the reaction by adding the methyl isocyanate, in gaseous or liquid form, over a period of time of from 1 to about 12 hours, to an agitated bed of solid particles of the thiohydroximate in the absence of a continuous liquid phase while removing the heat of reaction, the rates of isocyanate addition and heat removal being balanced so as to maintain the temperature of the reaction mass at or above 0°C but below the melting points of the thiohydroximate starting material and the thiohydroximate carbamate product, the mole ratio of said isocyanate to said thiohydroximate being in the range of about 0.95 to about 1.05.

2. Process of claim 1 wherein the rate of isocyanate addition and heat removal are balanced so as to maintain the temperature of the reaction mass at or above 25°C but below the temperature at which the reaction mass becomes tacky.

3. Process of claim 2 wherein the rates of isocyanate addition and heat removal are balanced such that the reaction mass resembles a damp powder throughout the period of isocyanate addition.

4. Process of claim 1 wherein at least one solid particulate inert diluent or a heel of thiohydroximate carbamate is mixed with the thiohydroximate particles before or during the reaction.

5. Process of claim 1 wherein at least one solid particulate inert diluent and a heel of the thiohydroximate carbamate are mixed with the thiohydroximate before or during the reaction.

6. Process of claim 1 wherein the molar ratio of isocyanate to thiohydroximate is in the range of 0.98 to 1.02.

7. Process of claim 1 wherein R is

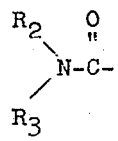

and $R_1$, $R_2$ and $R_3$ are methyl.

8. Process of claim 1 wherein R and $R_1$ are both methyl.

* * * * *